United States Patent [19]

Auinger

[11] Patent Number: 4,528,472
[45] Date of Patent: Jul. 9, 1985

[54] POLE-CHANGING THREE-PHASE WINDING FOR OPTIONAL, FRACTIONAL POLE-PAIR RATIOS

[75] Inventor: Herbert Auinger, Nuremberg, Fed. Rep. of Germany

[73] Assignee: Siemens Aktiengesellschaft, Munich and Berlin, Fed. Rep. of Germany

[21] Appl. No.: 508,790

[22] Filed: Jun. 29, 1983

[30] Foreign Application Priority Data

Jul. 6, 1982 [DE] Fed. Rep. of Germany ....... 3225253

[51] Int. Cl.³ .............................................. H02K 3/00
[52] U.S. Cl. .................................... 310/198; 318/773
[58] Field of Search ................ 310/180, 184, 198–208, 310/213; 322/90; 318/773, 777, 704

[56] References Cited

U.S. PATENT DOCUMENTS

| | | | |
|---|---|---|---|
| 3,614,497 | 10/1971 | Brenner | 310/201 |
| 3,927,358 | 12/1975 | Broadway et al. | 318/224 |
| 3,949,253 | 4/1976 | Broadway | 310/198 |
| 4,127,787 | 11/1978 | Auinger | 310/184 |
| 4,144,470 | 3/1979 | Auinger | 310/198 |
| 4,163,915 | 8/1979 | Fong | 310/198 |
| 4,284,919 | 8/1981 | Auinger | 310/198 |

FOREIGN PATENT DOCUMENTS 1036374 1/1959 Fed. Rep. of Germany .

OTHER PUBLICATIONS

"Symmetry of Multi-Phase Windings with Differently Grouped Parallel Branches or Winding Phases", Siemens Research & Development Reports, vol. 6 (1977), No. 4, pp. 211–219.

H. Auinger, "Polumschaltbare Dreiphasenwicklung in Umgruppierungsschaltung mit sechs Klemmen fur beliebige gebrochene Polzahlverhaltnisse", Siemens Research and Development Report, vol. 12, No. 2, 1983.

"Speed–Changing Motors with Pole–Amplitude Modulated Windings", by D. G. Searle, pp. 6–10.

Primary Examiner—R. Skudy
Attorney, Agent, or Firm—J. L. James; F. W. Powers

[57] ABSTRACT

For the desired pole-pair number combination $p_1/p_2$ always those coils are omitted from the individual phases of the first pole-pair number $p_2$, which form overlapping phase bands for the second pole-pair number in the coil side star; the remaining coils of each phase for $2p_1$ are distributed symmetrically along the periphery and in accordance with $$G + N_1 = \frac{2p_1}{t}$$

over the base-speed winding connected in three-phase wye/three-phase wye configuration and the dead winding branches $N_1$, connected in parallel or in series to it, for the first pole-pair number $p_1$, whereby at least a large portion of the omitted coils is configured as additional dead branches for the second pole-pair number $p_2$.

3 Claims, 18 Drawing Figures

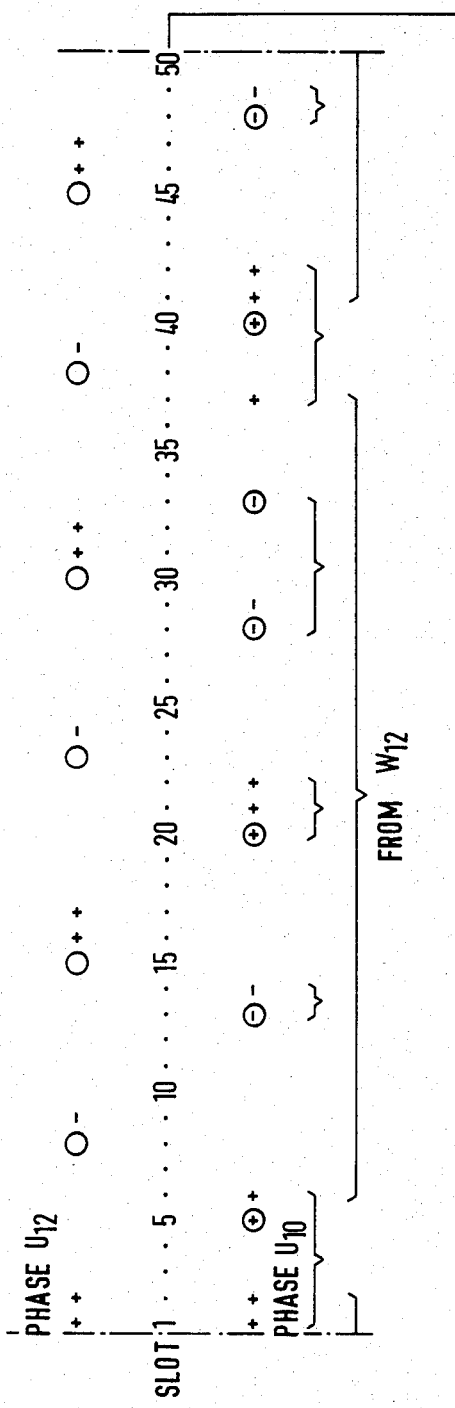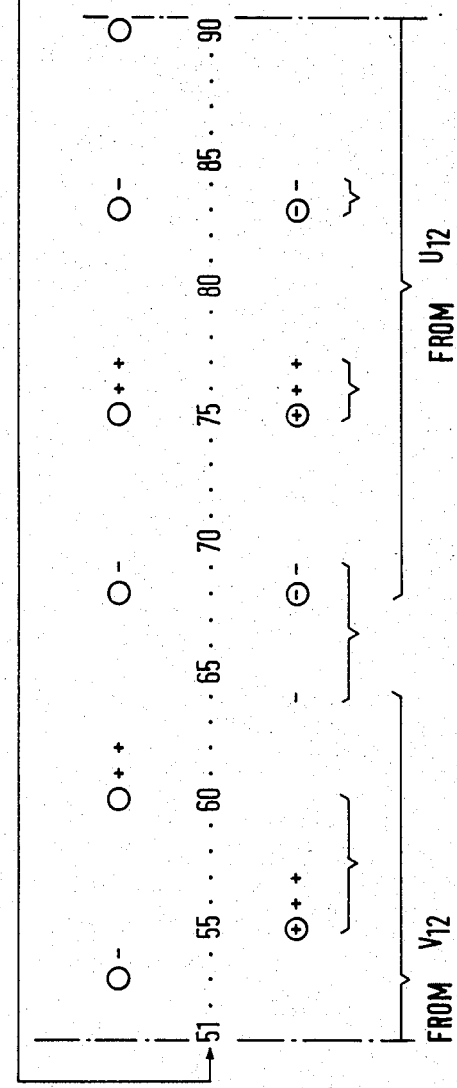
FIG 18

POLE-CHANGING THREE-PHASE WINDING FOR OPTIONAL, FRACTIONAL POLE-PAIR RATIOS

BACKGROUND OF THE INVENTION

The invention is related to a pole-changing, three-phase winding with base-speed winding branches that are effective in both pole-number steps which are allocated, one third each, to all three winding phases and N dead branches that are effective only at one pole-pair number.

Three-phase windings of the above mentioned type are disclosed in U.S. Pat. No. 4,144,470 dated Mar. 13, 1979 and U.S. Pat. No. 4,284,919 dated Aug. 18, 1981. In these windings the base speed winding branches G are connected in three phase delta/three-phase delta, or three phase wye/three-phase delta. Alternatively, the base speed winding branches G can be connected in three-phase wye/three-phase wye in order to both reduce the connections to only six terminals and to require only a single three-phase changeover switch. One or several dead branches for at least one of the two pole-pair numbers can be connected to the base-speed winding in parallel and/or series. By means of imbrication of windings and variation of the number of turns per unit length favorable operating characteristics can be achieved in an electric machine.

The three-phase windings with three-phase wye/three-phase wye connection of the base-speed winding, disclosed in U.S. Pat. No. 4,144,470 and U.S. Pat. No. 4,284,919, can only be implemented for pole-pair ratios in accordance with $$p_1/p_2 = \frac{3m \pm 1}{3n}.$$

For the first pole-pair number $p_1 = 3m \pm 1$, not divisible by three, a distribution of coils is provided for each winding phase which is always grouped symmetrically along the periphery and which can be divided regularly into $2p_1/t$ equal-phase winding branches. For the second pole-pair number $p_2 = 3n$, divisible by three, the coils belonging to the individual winding phases of the first pole-pair number $p_1 = 3m \pm 1$, with regard to their phase relationship for the second pole number $2p_2$, are wound in layers without gaps and without overlapping over the entire periphery of the coil side star. The individual winding coils or coil groups are allocated in sectors, with $\phi:\psi = G:N$, to the different base-speed and dead branch windings.

Based on the three-phase-band winding configuration of $p_2 = 3n$, fully symmetrical m.m.f. characteristics for the pole-pair number divisible by three are achieved for known windings only with full-pitch windings for this pole-number step. For other coil-pitch increments, such as short-pitch windings, generally, only single-axis symmetrical m.m.f. polygons are achieved for $p_2 = 3n$ or, as in the case of three-phase-band windings or imbricated windings with $\frac{2}{3}$ wide phase spread, only three-axis periodical "Goerges" polygons for the first pole-pair number not divisible by three are achieved for $p_2 = 3n$.

The known pole-changing pole amplitude modulated three-phase windings (PAM windings) connected in delta/double wye or wye/double wye, which can be configured for any fractional pole-pair ratios, require only six terminals. However, an additional switching contact is necessary for the double wye connection. Furthermore, these PAM windings generally have in both pole-number steps an irregular m.m.f. curve with undesirable subharmonic and even-order harmonic waves.

SUMMARY OF THE INVENTION

The invention facilitates the utilization of the three-phase wye/three-phase wye connection of the base-speed winding branches for any fractional pole-pole ratio where none of the two pole-pair numbers is divisible by three. In addition, a symmetrical and steady m.m.f. characteristic is achieved in each case with pole-number combinations having a pole-pair number divisible by three, even if short-pitched windings with arbitrary coil-pitch increments are used.

In general, the invention features, in one aspect, a pole-changing three-phase winding with base-speed winding branches G effective in both pole-number steps of which $\frac{1}{3}$ is allocated to all three windings phases and to N dead branches effective only with one number of pole-pairs each, so that the distribution of the windings coils into equal phase winding branches per phase is carried out for the first pole-pair number $p_1$ according to $$G + N = \frac{2p_1}{t},$$

where t is an interger divisor of $p_1$ and G is divisible by three, characterized by the fact that the optional, fractional pole-pair ratios and pole-numbers not divisable by three, in each case, for the selected first pole-pair number $p_1$, when the coils are distributed in the individual winding branches in each phase, those coils are not taken into consideration which, in the coil side star form overlapping phase bands on the second pole-pair number $p_2$ and the remaining coils in each phase of $p_1$ are distributed in even symmetrical groupings along the periphery in that at least a portion of these initially omitted coils are planned as additional dead-winding branches for the second pole-pair number $p_2$, so that the portion x of the coils, to be taken into conderation for the the first pole-pair number $$x = \frac{3n}{p_2},$$

where $n = 1, 2, 3 \ldots$

In general, the invention features, in another aspect, a pole-changing three-phase winding with base-speed winding branches G effective in both pole-number steps of which $\frac{1}{3}$ is allocated to all three winding phases into N dead branches effective only when one number of the pole-pairs each, characterized by the fact that for optional, fractional pole-pair ratios of which one of the pole-pair numbers $p_1$ is divisible by three, those coils for the first pole-pair number $p_1$ divisible by three are not taken into consideration for the allocation of the coils to the individual winding branches in each phase, which, in the coil side star form overlapping winding phases for the second pole-pair number $p_2$ and the remaining coils of each phase $p_1$ are distributed in the even and symmetrical groupings along the periphery and that at least a portion of these initially omitted is planned additional dead winding branches of second pole-pair number $p_2$, not divisible by three, so that portion x of the coils to be taken into consideration for the first pole-pair number divisible by three is $$x = \frac{3n}{p_2}$$

where n equals 1, 2, 3 . . .

In preferred embodiments, the pole-changing three-phase winding is characterized by a winding arrangement which is imbricated in such a way that the current in the outer-layer coil sides in all even-numbered slots flows in one direction and in all odd-numbered slots flows in the opposite direction.

The distribution of the winding phases, composed of $$G + N_1 = \frac{2p_1}{t}$$

basespeed and dead-branch windings for the first pole-pair number $p_1$, can vary over a wide range according to $G:N = \phi:\psi$. The coils omitted for the first pole-pair number are partially designed for use as additional dead-branch windings $N_2$ for the second pole-pair number $p_2$.

By connecting the dead branch windings, which generally exist in both pole-pair number steps in parallel or in series with the base-speed winding, in combination with an imbrication of the winding phases which can be carried out independently in both pole-number steps, the winding, according to the invention, can be adapted to a multitude of performance requirements of the machine.

A particularly favorable m.m.f. symmetry in both pole-pair number steps can be achieved by imbricated windings arranged so that the current flows in the positive direction through the outer layer coil sides in all even-numbered slots and in the negative direction in all odd-numbered slots.

For fractional pole-pair ratios with pole-pair numbers $p_1$ and $p_2$, which are not divisible by three, different solutions for three-phase windings and different characteristics are produced, depending on which pole-pair number is designated as the first pole-pair number. Therefore, in each case, one can start with conventional symmetrically grouped six-phase or three-phase band windings or imbricated winding arrangements. Dead-branch windings, which are connected in series with the base-speed winding, then have a phase relationship which is different than the other base-speed winding branches.

In contrast to existing three-phase windings with a base-speed winding connected in three-phase wye-/three-phase wye configuration, a symmetrical winding distribution for the pole-pair number not divisible by three is not considered for fractional pole-pair ratios, where one of the pole-pair numbers is divisible by three, but, according to the invention, a winding with a first pole-pair number divisible by three is always used.

Other features and advantages of the invention will be apparent from the following detailed description, and from the claims.

For a full understanding of the present invention, reference should now be made to the following detailed description and to the accompanying drawings.

BRIEF DESCRIPTION OF THE DRAWINGS

For a 10/8-pole three-phase winding for 120 slots:

For a different winding version for the same number of slots and pole number combination:

FIG. 18 shows diagrammatically the corresponding physical coil arrangement for each of phase $U_{12}$, $U_{10}$ and Table III corresponding technical data.

DETAILED DESCRIPTION

Figure 6:
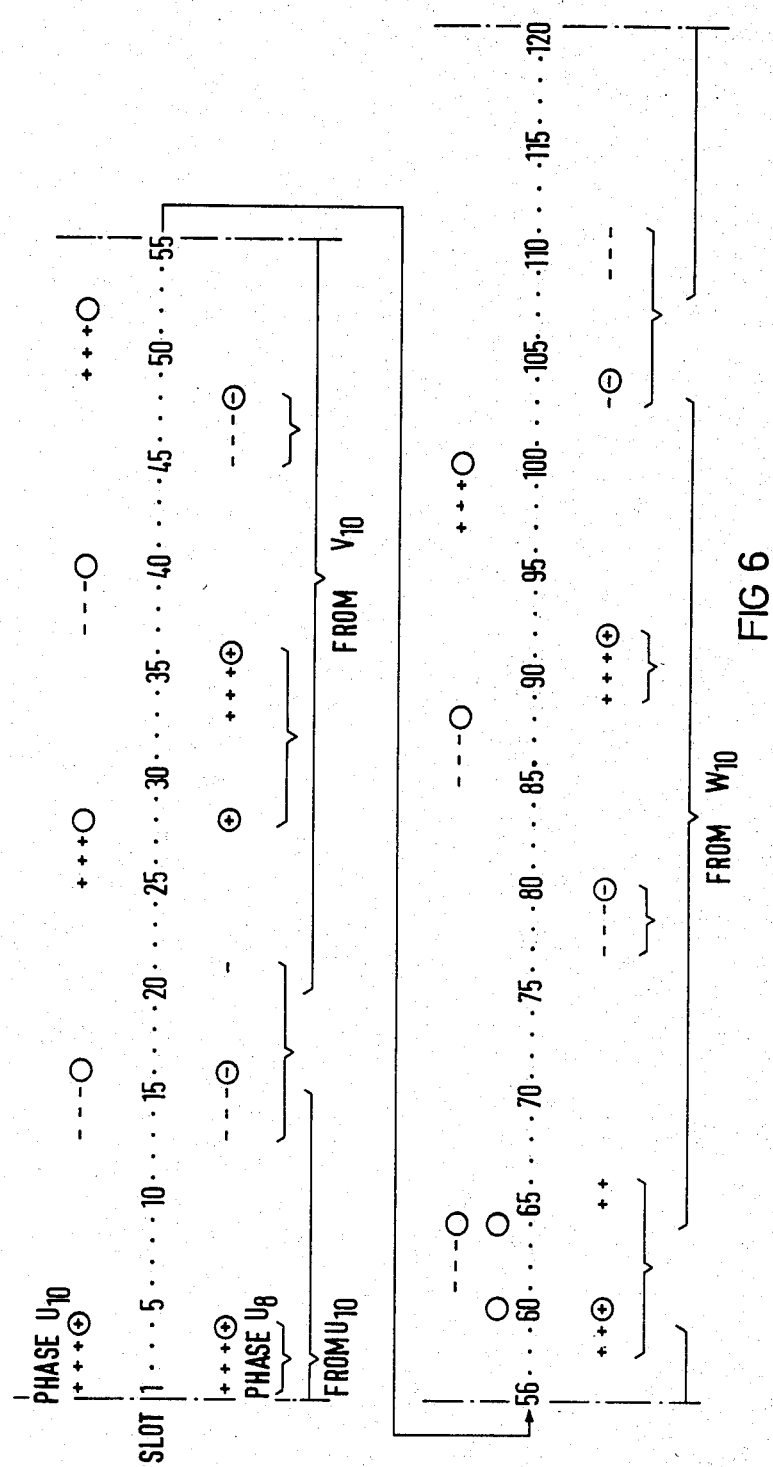
FIG. 6 shows diagrammatically the physical coil distribution for one of phase $U_{10}$, $U_8$, Table I winding factors, harmonic leakage factors and air-gap flux density relationships for different coil pitch increments.

Referring to FIGS. 1–6 the first example of a 10/8-pole three-phase winding will now be described. In this example $Z_N = 120$ slots and $2p_1 = 10$-pole six-phase band winding with $$q_{10} = \frac{Z_N}{6p_1} = \frac{120}{6.5} = 4$$

coils next to each other, per pole and phase, through which current flows from pole to pole in opposite directions (+, − sign). [cf. FIG. 6, upper line ($U_{10}$)].

Figure 1:
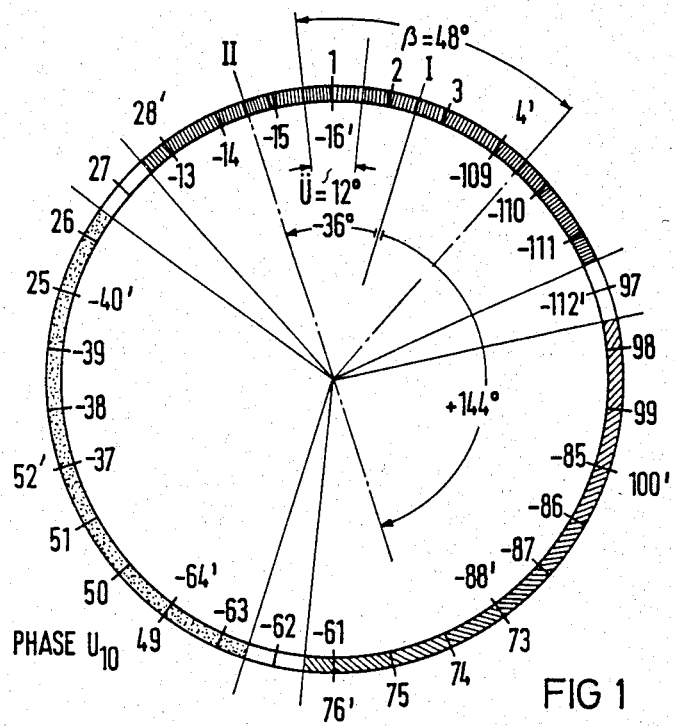
FIG. 1 is a diagrammatic view of up to 3 slotted stars and the phase relationship of the individual 10-pole winding phases serving as the starting basis for the second pole number step $2p_2 = 8$.
Figure 2:
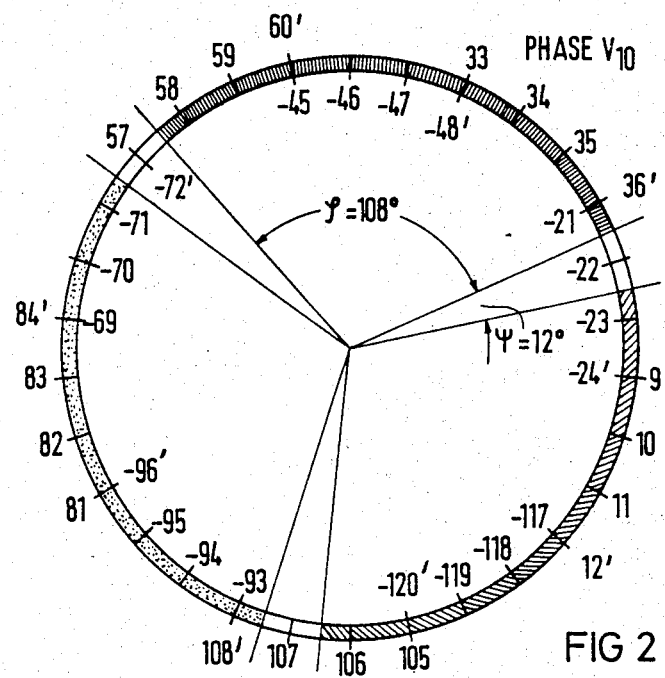
FIGS. 2 and 3 show diagrammatically the corresponding phase relationship of all coils forming phases $U_{10}$, $V_{10}$ and $W_{10}$ for the second pole number $2p_2 = 8$.
Figure 3:
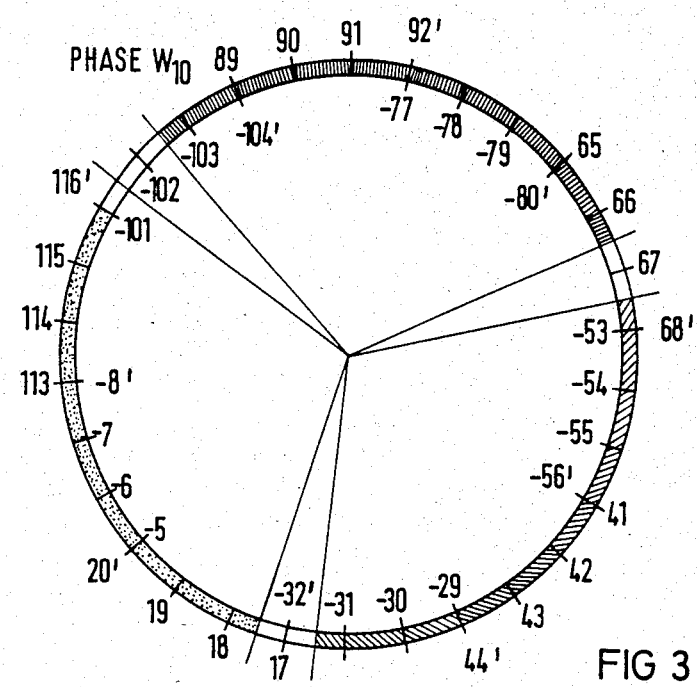

The corresponding phase relationship of all coils forming phases $U_{10}$, $V_{10}$, $W_{10}$ for the second pole number $2p_2 = 8$ are shown in FIGS. 1–3.

The phase spread of 60°, existing for the first pole number $2p_1 = 10$ decreases for the second pole number according to the pole-number ratio $$8/10 \text{ to } = 60° \times \frac{8}{10} = 48°.$$

In this case the individual phase bands follow each other in intervals of $$180° \times \frac{8}{10} = 144°$$

or 144°−180°=−36°. This is entered in FIG. 1 for the first two phase bands, which are formed by coils 1, 2, 3, and 4 (phase-band axis I) or −13, −14, −15 and −16 (phase-band axis II).

Based on this conventional six-phase-band winding for $2p_1 = 10$, the phase spreads for $2p_2 = 8$ are larger than their phase displacement so that overlapping areas of U=12°, which correspond to one slot, are the result.

The phase relationship of this total of 10 overlapping phase bands per phase is different for each of the three phases, as shown in FIGS. 1–3; for example for coils 1, −16 (phase $U_{10}$) or 60, −45 (phase $V_{10}$) as well as 92, −77 (phase $W_{10}$).

In order to facilitate the separation into nine winding branches, of which three winding branches form an equivalent symmetrical three-phase system for the second pole number $2p_2 = 8$ as required for a three-phase wye/three-phase wye connection, all coils that are identified by a prime in FIGS. 1 and 3, which would form overlapping phase bands for $2p_2 = 8$, are omitted, in accordance with the invention. Thus, in this invention, each phase band is composed of only three coils instead of the conventional four coils. The ten coils omitted for the first pole number $2p_1 = 10$, are for example coils 4, −16, 28, −40, 52, −64, 76, −88, 100, −112 of phase $U_{10}$, or 12, −24, 36, −48, 60, −72, 84, −96, 108, −120 of phase $V_{10}$, or −8, 20, −32, 44, −56, 68, −80, 92, −104 and 116 of phase $W_{10}$. These coils all exhibit, according to FIG. 4, the same phase relationship for the second pole number $2p_2 = 8$ as the "reduced" phases $U_{10}$, $V_{10}$, $W_{10}$ according to FIGS. 1–3. Referring to FIGS. 1–4, the 30-point symmetrical stars can be distributed, at a ratio of $\phi:\psi = 9:1$, into base-speed winding branches (⟨⟨⟨, ⟨⟨⟨, and ⟨⟨⟨) and dead branches (⟨⟨⟨).

Figure 4:
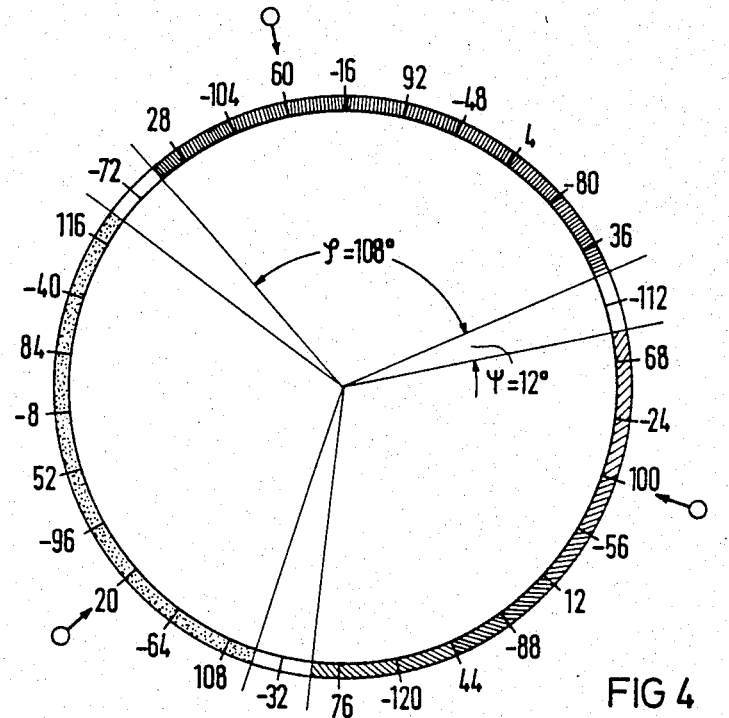
FIG. 4 shows diagrammatically the phase relationship if $2p_2 = 8$ of the coils are omitted and if $2p_1 = 10$.
Figure 5:
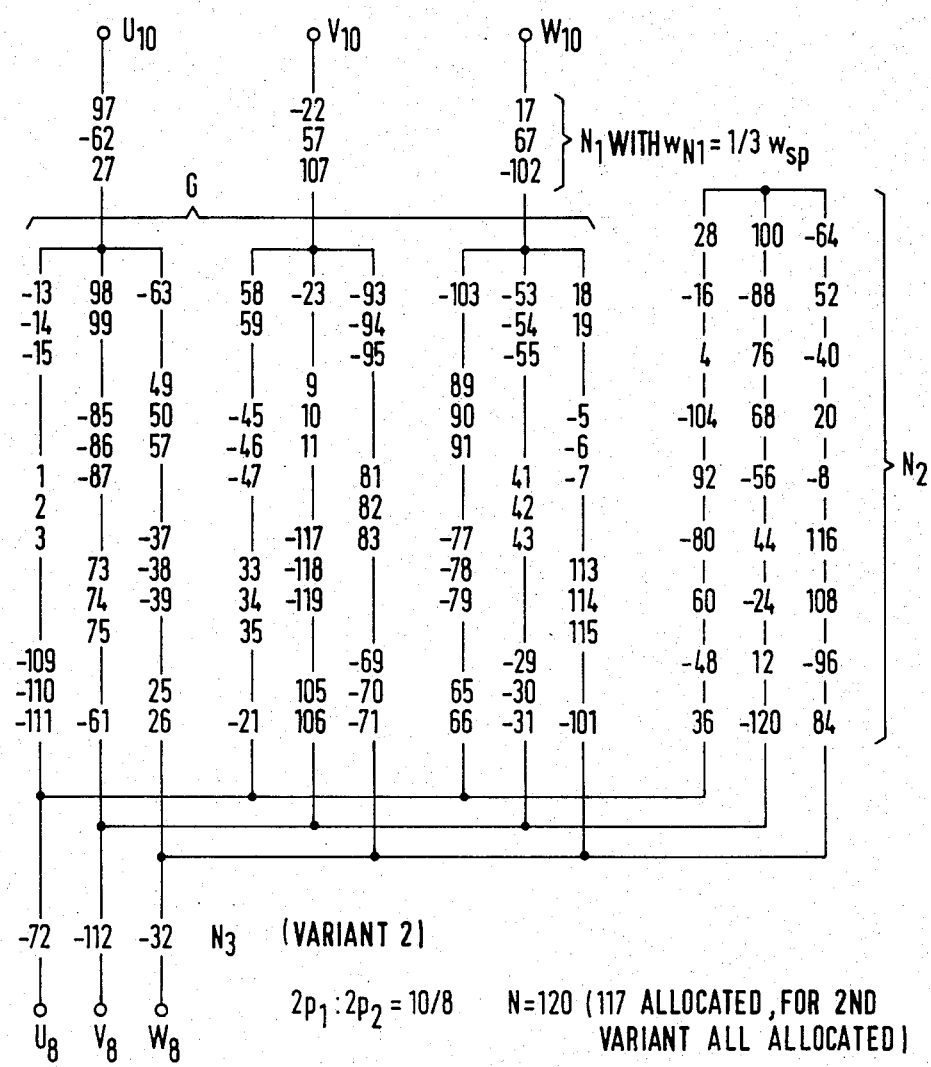
FIG. 5 shows diagrammatically the complete winding connection diagram of the three-phase winding according to FIGS. 1 to 4 in two configuration examples.

The complete connection diagram of this winding, shown in FIG. 5, includes two variants. First $N_1$ dead branches, only effective when $2p_1 = 10$, whose coils have one third the number of windings as the base-speed winding, $$\left( \text{for example } w_{N1} = \frac{1}{3} w_{sp} \right)$$

are connected in series with the three-phase wye/three-phase wye connected base-speed winding G. As shown in FIGS. 1–3, the base-speed winding G and the dead branches $N_1$ are formed from the coils of the reduced phase $U_{10}$, $V_{10}$, and $W_{10}$. The coils, omitted for $2p_1 10$ and shown in FIG. 4, are distributed in the same manner and are connected to the base-speed winding G as additional, parallel $N_2$ dead branches with $w_{N2} = w_{sp}$, which are effective only for $2p_2 = 8$. In the first variant, the coils −32, −72, −112 are omitted. In the second variant the coils form the series-connected $N_3$ dead branches for the second pole number $2p_2 = 8$, shown by dotted lines, with $$W_{N3} = \frac{1}{3} W_{sp}.$$

The first variant results in an effective number of turns per phase $w_{8.1} = 9w_{sp}$ for the second pole number $2p_2 = 8$. The second variant results in an effective number of turns per phase $$w_{8.2} = 9\frac{1}{3} w_{sp}.$$

For both variants, the effective number of turns per phase is $w_{10} = w_{sp}$ for the first pole number $2p_1 = 10$ (w means the number of windings of the coils for the three base-speed turns branches or the $N_2$ dead branches connected in parallel with it).

For both variants, the $N_1$ dead branches for the first pole number $wp_1 = 10$ or the $N_3$ dead branches for the second pole number $2p_2 = 12$, which each have coils with number of turns $w_{sp}/3$, are connected in series with the base-speed winding branches.

The physical distribution of coils in slots 1–120 is shown in FIG. 6 for one winding of each of phase $U_{10}$ and $U_8$ for both pole numbers. For phase $U_8$, the allocation of the winding branches of phases $U_{10}$, $V_{10}$ $W_{10}$ for the first pole number $wp_1 = 10$ is also indicated. The coil sides omitted for $2p_1 = 10$ and belonging to the $N_2$ dead branches for $2p_2 = 8$ in FIG. 5, are identified by circles (o) in accordance with FIG. 4. Coil indicated by a dotted circle for $U_8$ for slot 72 and belonging to dead branch $N_3$, only exists in the second variant.

The two other phases $V_{10}$, $W_{10}$ or $V_8$, $W_8$ are offset by a third of the circumference against each other and against $U_{10}$ or $U_8$ and are designed in the same manner.

The resulting winding factors $\xi_{10}$, $\xi_8$, the harmonic leakage factors $\tau_{o10}$, $\tau_{o8}$, and the air-gap flux density ratios $B_{10}/B_8$, which depend on the corresponding coil pitch width, are compiled below in Table I for both variants.

TABLE I

| (10/8-pole N = 120) corresponding to FIG. 5 | | | | | | |
|---|---|---|---|---|---|---|
| Coil Pitch | | 1-17 | $\tau_8$ 1-16 | 1-15 | 1-14 | $\tau_{10}$ 1-13 |
| $2p_1 = 10$ for both Variants | $\xi_{10}$ | 0,8464 | 0,9029 | 0,9440 | 0,9689 | 0,9773 |
| | $\sigma_{o10}$ | 0,021 | 0,009 | 0,008 | 0,014 | 0,021 |
| Variant 1 $W_{10}:W_8 =$ 10:9 | $\xi_8$ | 0,8533 | 0,8600 | 0,8533 | 0,8412 | 0,8179 |
| | $\sigma_{o8}$ | 0,049 | 0,051 | 0,038 | 0,063 | 0,069 |
| | $B_{10}/B_8$ | 1,134 | 1,070 | 1,017 | 0,977 | 0,941 |
| Variant 2 $W_{10}:W_8 =$ 10:9⅓ | $\xi_8$ | 0,8430 | 0,8477 | 0,8430 | 0,8291 | 0,8062 |
| | $\sigma_{o8}*$ | 0,062 | 0,049 | 0,055 | 0,063 | 0,066 |
| | $B_{10}/B_8$ | 1,162 | 1,095 | 1,042 | 0,998 | 0,962 |

*Fictitious values (for identical branch currents)

During 10-pole operation, fully symmetrical flux directions with hexagonal or dodecagonal "Goerges" polygons are achieved with pole to pole coil distribution remaining the same as shown in FIG. 6. 8-pole operation, however, results in slightly different m.m.f. characteristics between poles, because of the different distribution of the four or five coils per pole and phase according to FIG. 6. Thus, as in the case of a fractional slot winding, subharmonic waves, such as secondary 2- and 4-pole m.m.f waves, are also excited in 8-pole operation in addition to even-numbered harmonics. The fictitious harmonic leakage factors $\sigma_{o8}$ * in Table I, calculated from the flux polygons produced in the usual manner, apply under the assumption of identical branch currents throughout. In reality, the subharmonic and even-numbered harmonics are attenuated during 8-pole operation by the diecast rotor cage as well as by the parallel branches of the winding so that unequal branch currents and thus more favorable harmonic leakage factors than the ones calculated are achieved. To clarify the above reference can be made to "Symmetry of Multi-phase Windings with Differently Grouped Parallel Branches or Winding Phases", in Siemens Research and Development Reports, Vol. 6 (1977), No. 4, pages 211 to 219, in which it is set forth that uneven branch currents always occur when individual branches of a complete winding fail or are omitted. In addition these uneven current also occur in combination series-parallel circuits with differing coil flux, such as in pole-changing windings with dead branches in a series connection with a dead branch coil with the number of turns $$w_{Np2} \neq \frac{1}{3} w_G.$$

Figure 7:
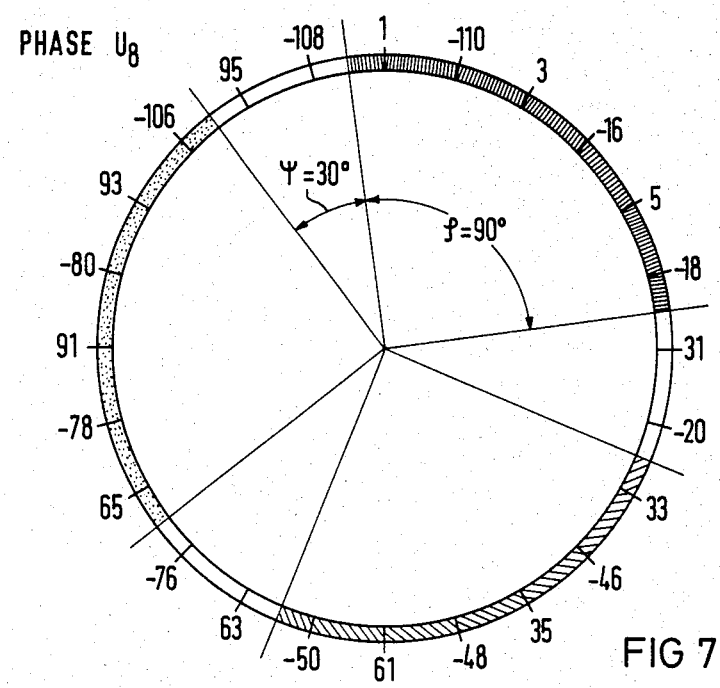
FIG. 7 is a diagrammatic view of up to ten 10-pole slotted stars for the 8-pole winding strands serving here as the starting point as well as the coils omitted for $2p_1 = 10$.
Figure 8:
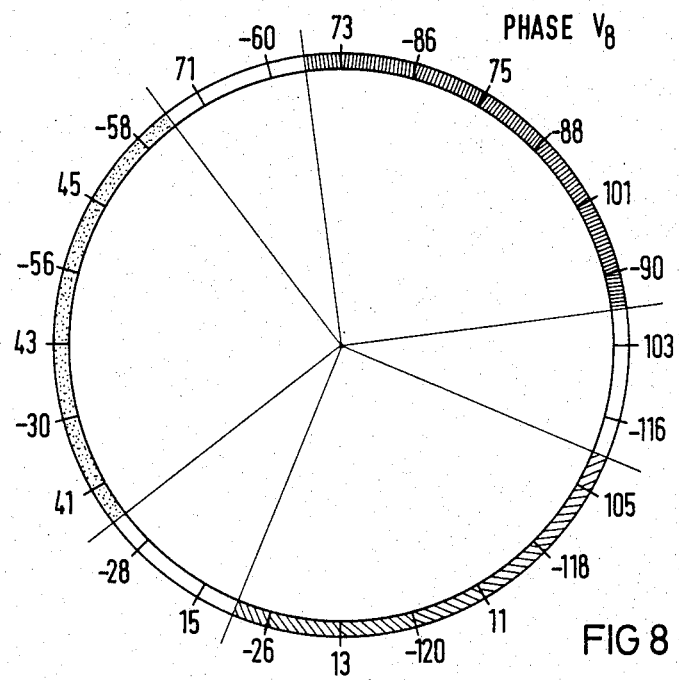
FIGS. 8–10 show diagrammatically the phase relationship of the coils remaining in the three phases $U_8$, $V_8$ and $W_8$ if $2p_2 = 10$.
Figure 9:
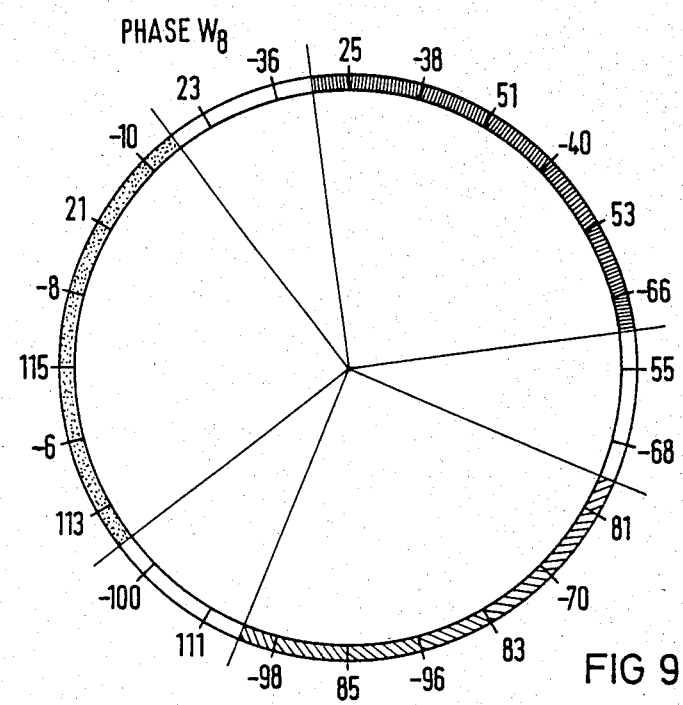
Figure 10:
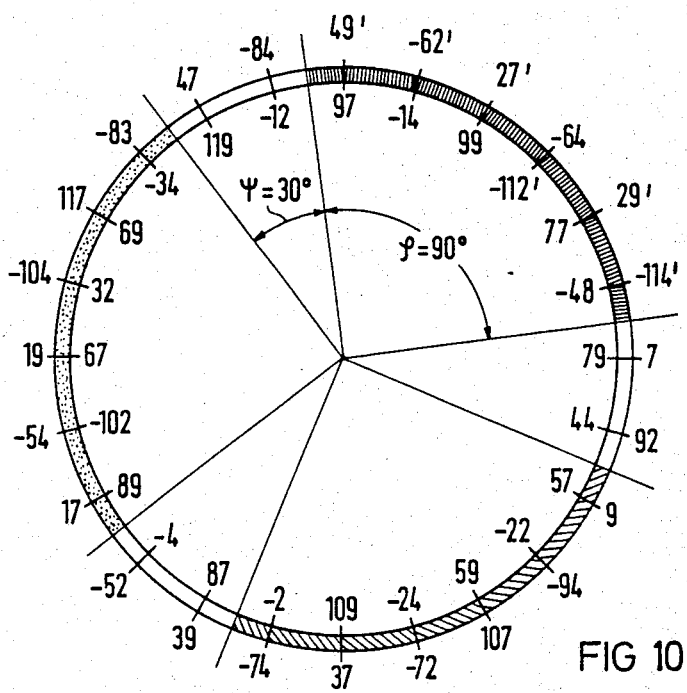

The second example of a three-phase winding with $Z_N = 120$ slots and an identical pole-number combination, is based on a $2p_1 = 8$-pole six-phase imbricated winding with $$q_8 = \frac{Z_N}{6p} = \frac{120}{6.4} = 5$$

slots per pole and phase. In this case, the imbrication of windings is performed in such a way that positive current flows through the coil sides of the outer layer in all odd-numbered slots and negative current flows in all even-numbered slots (cf. FIG. 12). In order to obtain the slotted stars without overlapping, required for the standard distribution of windings, for the second pole number $2p_2 = 10$, the two outer coils of each 8-pole winding zone are omitted. The phase relationship of the coils remaining in the three phases $U_8$, $V_8$ and $W_8$, if $2p_2 = 10$, is shown in FIGS. 7–9. The coils omitted in the phases indicated for the first pole number $2p_1 = 8$, are for example coils 7, −14, −22, 29, 37, −44, −52, 59, 67, −74, −81, 89, 97, −104, −112, and 119 of phase $U_8$, −2, 9, 17, −24, −32, 39, 47, −54, −62, 69, 77, −84, −92, 99, 107, and −114 of phase $V_8$, or −4, −12, 19, 27, −34, −42, 49, 57, −64, −72, 79, 87, −94, −102, 109, 117 of phase $W_8$, as shown in FIG. 10. The overall result is the same 10-pole phase relationship as that of phases $U_8$, $V_8$, $W_8$ reduced by a ratio of 3:5 according to FIGS. 7–9. The allocation to the base-speed winding branches G and the 8-pole $N_1$ dead branches for the first pole number $2p_1 = 8$, can be carried out according to FIGS. 7–9 with $G:N_1 = \phi:\psi = 90°:30° = 3:1$.

In the same manner as the coil side stars shown in FIGS. 7–9, the corresponding in-phase 10-pole coil side star for the total of all coils omitted for the first pole number $2p_1 = 8$, can also be subdivided. The coils allocated in this case to sectors $\sigma$ are used for the $N_2$ dead branches if $2p_2 = 10$ and the coils allocated to sectors $\psi$ are omitted. This results in the connection diagram of the completed winding, shown in FIG. 11. The base-speed winding is connected in three-phase wye/three-phase wye configuration, to which the dead branches $N_1$ and $N_2$, with $$w_{N1} = w_{N2} = \frac{1}{3} w_{sp}$$

number of turns each, are connected in series for both pole number steps.

Only 108 of the total of 120 slots are allocated to coils. In $2p_1 = 8$-pole operation, the 54 coils of the base-speed winding G and 18 coils of the $N_1$ dead branches carry current, such that 72 coils of the total of 108 available coils, that is only 66.66% (referenced to 120 slots, even only 60%) carry current. In comparison to the first example shown in FIGS. 1–6, this results in a less favorable machine utilization with 8-pole operation. However, the arrangement of the coil sides remains the same for each pole pair, as shown in FIG. 12, for one phase each of $U_8$ and $U_{10}$ so that in both pole number steps a fully symmetrical m.m.f. characteristic is achieved which, has a very low harmonic content and no subharmonics. The coil sides omitted for $2p_1 = 8$ or $2p_2 = 10$, belonging to dead branches $N_2$, are indicated by primes in FIG. 12. During 10-pole operation (which is the same as for the first example according to FIGS. 1–6) a total of 90 coils (54 of the base-speed winding and 36 of dead branch $N_2$) are current carrying. Instead of the series connection shown in FIG. 11, for coils with $\frac{1}{3}w_{sp}$ for the dead branches $N_1$ or $N_2$, effective only for $2p_1 = 8$ or $2p_2 = 10$, two parallel dead branches with a number of turns of $\frac{2}{3}w_{sp}$ can be provided in each case ($w_{sp}$ = number of turns of the base-speed winding).

Table II below lists, depending on the differing pitch widths, the winding factors, the harmonic leakage factors $\sigma_{o8}$, $\sigma_{o10}$ calculated from the symmetrical "Goerges" polygons which can be determined in the usual manner, and the air-gap density ratios $B_8/B_{10}$.

TABLE II

Figure 11:
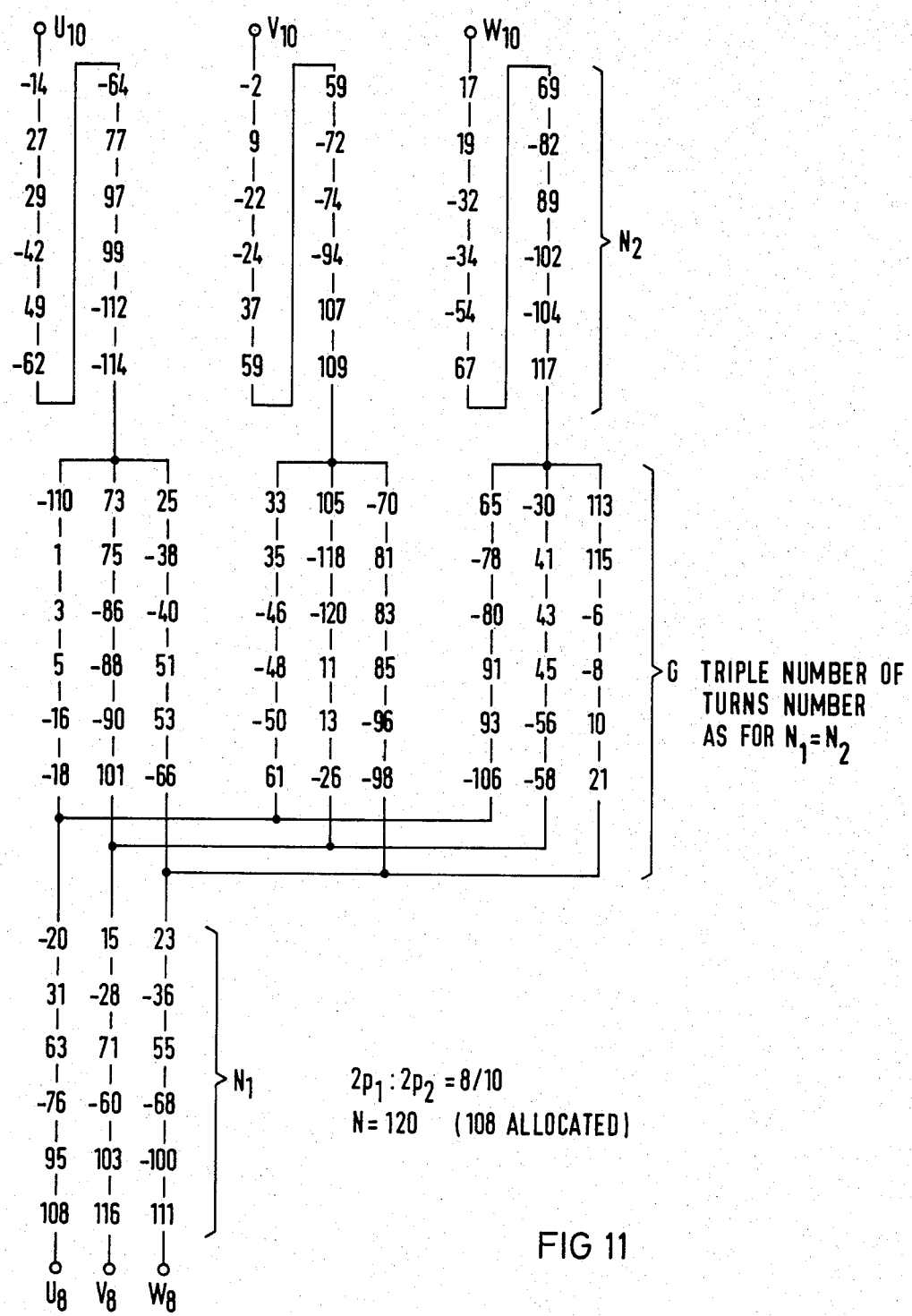
FIG. 11 shows diagrammatically the complete winding connection diagram of the three-phase winding of FIGS. 7 to 10.
Figure 12:
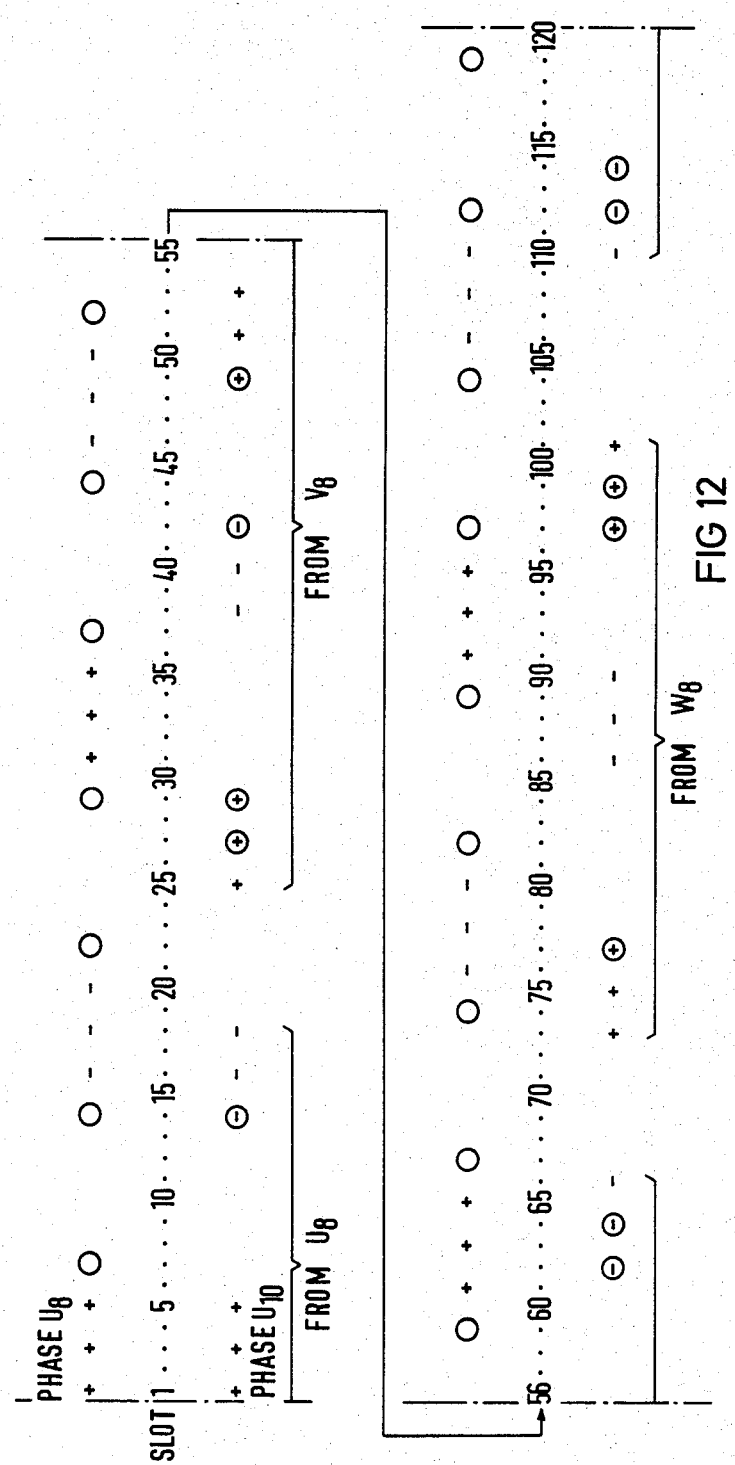
FIG. 12 shows diagrammatically the corresponding physical coil distribution for each of phase $U_8$, $U_{10}$ and Table II corresponding technical data for this winding for a 12/10-pole three-phase winding for 90 slots.

| (8/10-pole N = 120) corresponding to FIG. 11 | | | | | |
|---|---|---|---|---|---|
| Coil Pitch | | 1-12 | $\tau_{10}$ 1-13 | 1-14 | 1-15 |
| $2p_1 = 8$ | $\xi_8$ | 0,8609 | 0,8962 | 0,9218 | 0,9372 |
| | $\sigma_{o8}$ | 0,0111 | 0,0088 | 0,0111 | 0,0057 |
| $2p_2 = 10$ | $\xi_{10}$ | 0,8952 | 0,9029 | 0,8952 | 0,8721 |
| | $\sigma_{o10}$ | 0,0169 | 0,0089 | 0,0169 | 0,0112 |
| $B_{10}/B_8$ | | 0,9617 | 0,9927 | 1,030 | 1,075 |

The third example, according to FIGS. 13–18 refers to a 10/12-pole three-phase winding for $Z_N = 90$ slots, which, in contrast to the windings disclosed in U.S. Pat. No. 4,144,740, is based on a 6-phase winding distribution for the pole step number $2p_1 = 12$ which is divisible by 3. Therefore, independent of the pitch width, a fully symmetrical 12-pole m.m.f. characteristic is achieved in all cases, in contrast to the existing 12/10-pole windings, which exhibit this characteristic only for full-pitch windings with the pole-pair number divisible by three. For other pitch widths, single-axis "Goerges" polygons are normally obtained; three-axis periodic "Goerges" polygons are obtained only for the special cases of a three-phase-band winding or a phase spread fanned out by imbrication of windings to $2\pi/3$, with an initial pole-pair number $2p_1 = 10$, which in this case is not divisible by three. The three-phase winding for $2p_1 12$, shows $$q_{12} = \frac{Z_N}{6p_1} = \frac{90}{6.6} = 2.5$$

slots per pole and phase, which, in conventional designs, are formed from coil groups with alternately two and three coils (cf. FIG. 18, phase $U_{12}$).

Figure 13:
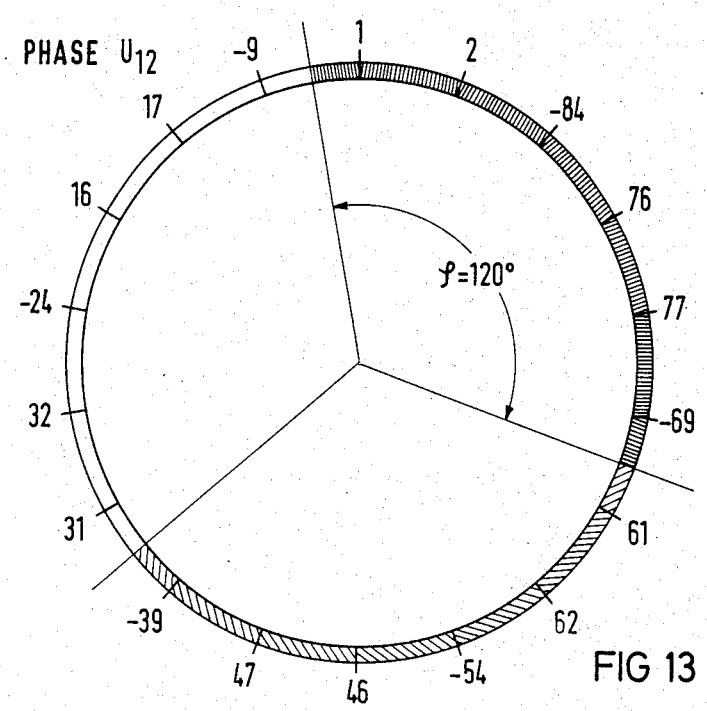
FIGS. 13–16 show diagrammatically 10-pole slotted stars for the 12-pole winding phases and for the coils omitted for $2p_1 = 12$.
Figure 14:
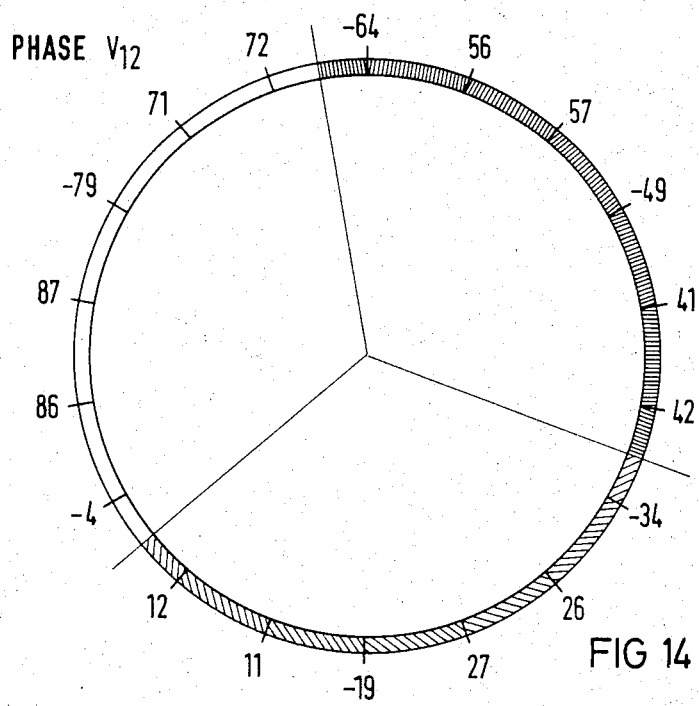
Figure 15:
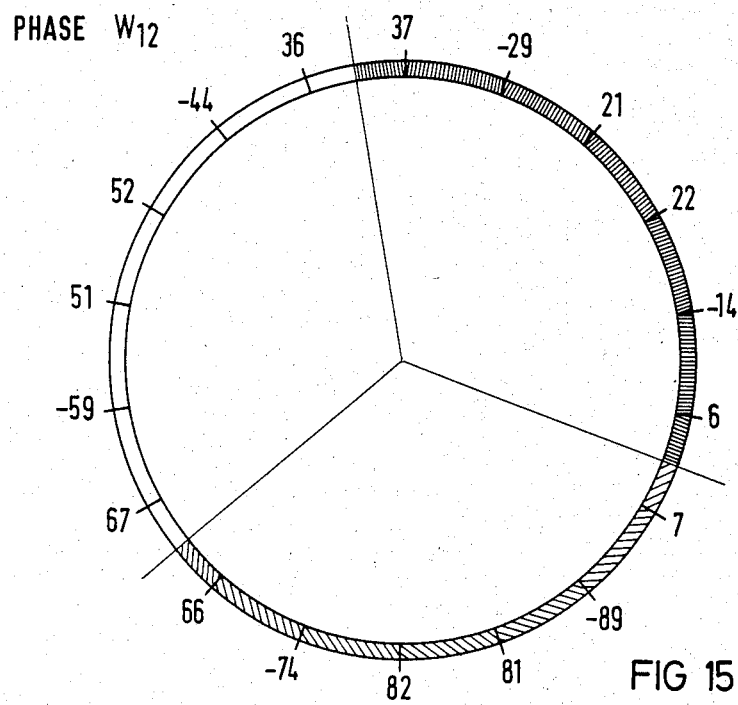

To obtain coil side stars without overlapping for each 12-pole phase $U_{12}$, $V_{12}$, $W_{12}$, for $2p_2 = 10$, in accordance with FIGS. 13–15, the number of the coils used in the 12-pole winding step must be reduced at a ratio of 3:5 by omitting one coil in each phase band so that 12-pole winding phases remain with alternately two coils carrying positive current and one carrying negative current. These reduced 12-pole phases can be classed completely with the nine winding branches of the G base-speed winding connected in three-phase wye/three-phase wye configuration, as shown in FIGS. 13–15.

Figure 16:
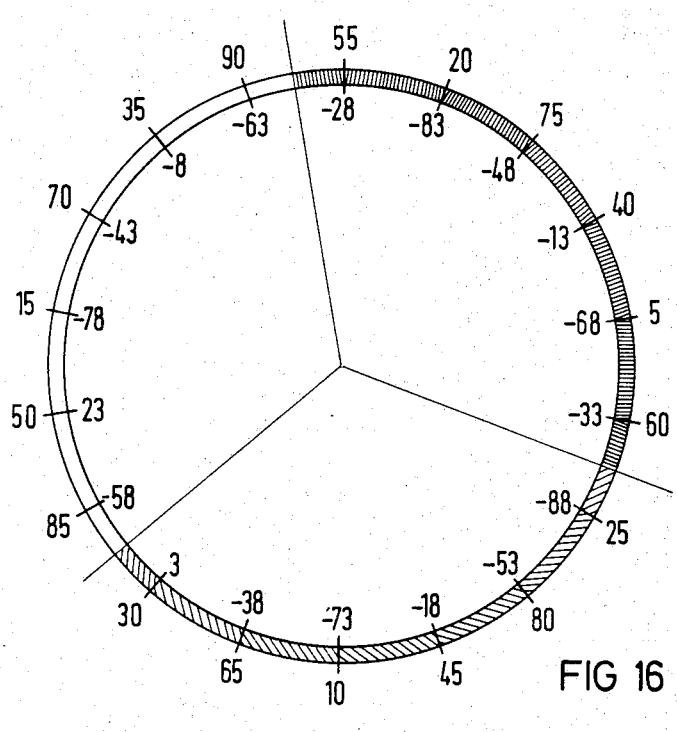
Figure 17:
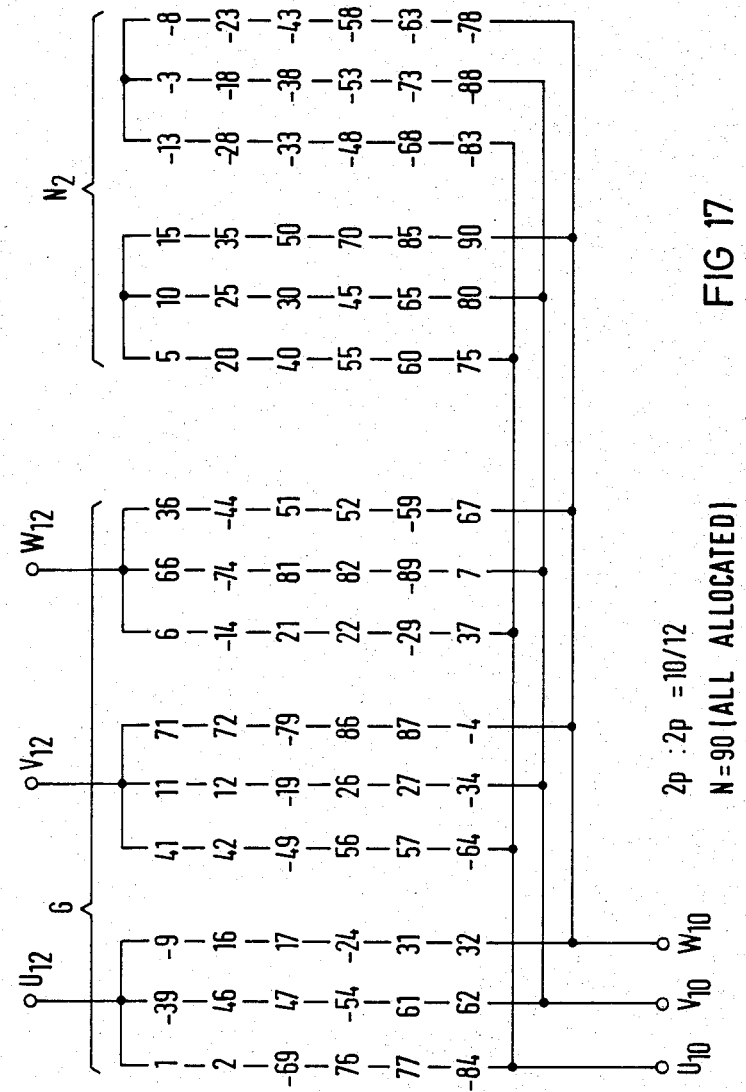
FIG. 17 shows diagrammatically the complete connection diagram of this three-phase winding.

Referring to FIG. 16, the coils omitted in each phase of the first pole number $2p_1 = 12$ can be subdivided in the same manner as shown in FIGS. 13 to 15 and can be operated as parallel N dead branches which are effective only for $2p_1 = 10$-pole operation. A complete connection diagram of such a winding configuration, with identical coils throughout, is shown in FIG. 17. The effective number of turns per phase is the same in both pole number steps and is $w_{12} = w_{10} = 6w_{sp}$.

The physical coil side distribution for phases $U_{12}$ and $U_{10}$ is shown in FIG. 18. For the remainder, the same as shown in FIGS. 6 and 12 applies in this case.

In Table III below, the winding factors, harmonic leakage factors and air-gap flux density relationships are again compiled for different pitch widths.

TABLE III

| (12/10-pole, N = 90) corresponding to FIG. 17 | | | | |
|---|---|---|---|---|
| Coil Pitch | | $\tau_{10}$ 1-10 | $\tau_{12} + \dfrac{\tau N}{1}$ 1-9 | $\tau_{12} - \dfrac{\tau N}{2}$ 1-8 |
| $2p_1 = 12$ | $\xi_{12}$ | 0,9476 | 0,9909 | 0,9909 |
|  | $\sigma_{o12}$ | 0,042 | 0,0176 | 0,0176 |
| $2p_2 = 10$ | $\xi_{10}$ | 0,8312 | 0,8186 | 0,7811 |
|  | $\sigma_{o10}$ | 0,102 | 0,041 | 0,108 |
| $B_{12}/B_{10}$ | | 1,053 | 0,991 | 0,946 |

The harmonic leakage factors are calculated in this case from the "Goerges" polygons which in both pole number steps have a three-axis symmetrical shape which, for $2p_2 = 10$, is due to the three-phase band winding distribution shown in FIGS. 13–16 and, for $2p_1 = 12$, to the half-slot winding (for an integer-slot winding, six-axis "Goerges" polygons would result).

In the manner explained in the first two examples, three-phase windings for optional, fractional pole-pair ratios can be obtained with pole-pair numbers which are not divisible by three, whereby in each case a symmetrical winding distribution can be assumed for one as well as the other pole-pair number. In the case of pole-number combinations with a pole-pair number divisible by three (third example) it serves as the first pole-pair number $p_1$ and a symmetrical distribution of windings for the pole-pair number divisible by three is provided.

Portion x of the coils to be taken into consideration for the first pole-pair number $p_1$ results from the requirement of a non-overlapping coil side star for each $2p_1$ pole winding phase with the second pole-pair number $p_2$ according to:

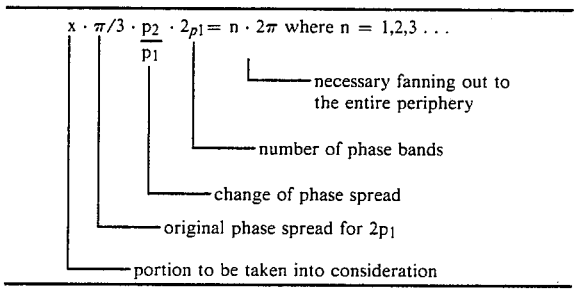

i.e.

$$x = \frac{3}{p_2} \text{ or } \frac{3n}{p_2}.$$

The remaining coils are omitted for $2p_1$ and are at least partially used as dead branches $N_2$ for the second pole-pair number.

In the first example $p_2$ was equal to 4 and thus the distribution ratio $x = \frac{3}{4}$. In the second and third configuration example $p_2$ was equal to 5 and the corresponding distribution ratio was $x = 3/5$.

The allocation of the coils remaining with the original pole-pair number (portion x) to the three winding branches of the base-speed winding connected in $Y^3/Y^3$, as well as to the dead branches $N_1$, not effective for $p_2$, is carried out analogously with U.S. Pat. No. 4,144,470 or U.S. Pat. No. 4,284,919 according to $$G + N_1 = \frac{2p_1}{t};$$

where t is an integer divisor of $2p_1$ and G a multiple of three.

In the first example, 2p was equal to 10 and $G:N_1\sigma_1\psi=9:1$; a distribution with $G:N_1=6:4$ is also possible. In the second example, $2p_1$ was equal to 8 and the distribution ratio was $G:N_1=6:2$. In the third example $2p_1$ was equal to 12 and the remaining portion of the winding was allocated entirely to the base-speed winding G, with for example $N_1=0$.

Optional connection of dead branches $N_1$ and $N_2$, which exist in both pole number steps, in parallel or series, according to the invention, allows the pole-changing three-phase winding to be varied and adapted in many ways. In addition to the simple connections to only six terminals in the case of $Y^3/Y^3$ (especially in cases with a large pole number spread), connection variants can also be made which are analogous to U.S. Pat. No. 4,144,470, with the base-speed winding connected in a delta/delta$^3$Y/delta$^3$ configuration.

Additional variations are possible by imbrication of the winding phases, which can be carried out independently of each other for both pole number steps. With regard to the symmetry of the m.m.f. characteristics in both pole-number steps, those imbrications prove to be particularly favorable where current in the outer layer coil sides flows in the positive direction in all even-numbered slots and in the negative direction in all odd-numbered slots (cf. the second example shown in FIGS. 7–12).

There has thus been shown and described novel apparatus for a pole-changing three-phase winding which fulfills all the objects and advantages sought therefor. Many changes, modifications, variations and other uses and applications of the subject will, however, become apparent to those skilled in the art after considering the specification and the accompanying drawings which disclose embodiments thereof. All such modifications, variations and other uses and applications which do not depart from the spirit and scope of the invention are deemed to be covered by the invention which is limited only by the claims which follows.

What is claimed is:

1. A pole-changing three-phase winding with base-speed winding branches G effective in both pole-number steps of which one third each is allocated to all three winding phases and to N dead branches effective only with one number of pole-pairs each, so that the distribution of the winding coils into equal-phase winding branches per phase is carried out for the first pole-pair number $p_1$ according to $$G + N = \frac{2p_1}{t}$$

where t is an integer divisor of $p_1$ and G is divisible by three, characterized by the fact that for optional, fractional pole-pair ratios with pole-pair numbers not divisible by three, in each case, for the selected first pole-pair number $p_1$, when the coils are distributed to the individual winding branches in each phase, those coils are not taken into consideration which, in the coil side star form overlapping phase bands for the second pole-pair number $p_2$ and the remaining coils of each phase for $p_1$ are distributed in even and symmetrical groupings along the periphery and that at least a portion of these initially omitted coils are planned as additional dead winding branches for the second pole pair number $p_2$, so that the portion x of the coils, to be taken into consideration for the first pole-pair number is $$x = \frac{3n}{p_2},$$

where $n = 1, 2, 3, \ldots$

2. A pole-changing three-phase winding with base-speed winding branches G effective in both pole-number steps of which one third each is allocated to all three winding phases and to N dead branches effective only with one number of pole-pairs each, characterized by the fact that, for optional, fractional pole-pair ratios, of which one of the pole-pair numbers $p_1$ is divisible by three, those coils for the first pole-pair number $p_1$ divisible by three are not taken into consideration for the allocation of the coils to the individual winding branches in each phase, which, in the coil side star form overlapping winding phases for the second pole-pair number $p_2$ and the remaining coils of each phase for $p_1$ are distributed in even and symmetrical groupings along the periphery and that at least a portion of these initially omitted coils is planned as additional dead winding branches for the second pole-pair number $p_2$, not divisible by three, so that the portion x of the coils to be taken into consideration for the first pole-pair number divisible by three is $$x = \frac{3n}{p_2},$$

where $n = 1, 2, 3, \ldots$

3. The pole-changing three-phase winding according to claims 1 or 2, characterized by a winding arrangement which is imbricated in such a way that the current in the outer-layer coil sides in all even-numbered slots flows in one direction and in all odd-numbered slots flows in the opposite direction.

* * * * *

UNITED STATES PATENT AND TRADEMARK OFFICE
CERTIFICATE OF CORRECTION

PATENT NO. : 4,528,472

DATED : July 9, 1985

INVENTOR(S) : Herbert Auinger

It is certified that error appears in the above—identified patent and that said Letters Patent are hereby corrected as shown below:

Column 1 line 49, correct "$\phi$" to read --$\zeta$--.
Column 3 line 20, correct "$\phi$" to read --$\zeta$--.
Column 5 line 37, correct "$\phi$" to read --$\zeta$--.
Column 5 line 54, correct "$2_{p1}10$" to read --$2_{p1} = 10$--.
Column 6 line 24, after coil, correct by inserting -- -72 --; correct "by a" to read --in FIG 4--.
Column 6 line 25, correct "dotted circle" to read --and FIG 5--;
Table I correct to read:

TABLE I

(10/8-pole N = 120) corresponding to FIG. 5

| Coil Pitch | | 1-17 | $\hat{=}\tau 8$ 1-16 | 1-15 | 1-14 | $\hat{=}\tau 10$ 1-13 |
|---|---|---|---|---|---|---|
| $2_{p1} = 10$ | $\xi 10$ | 0.8464 | 0.9029 | 0.9440 | 0.9689 | 0.9773 |
| for both | $\sigma_o 10$ | 0.021 | 0.009 | 0.008 | 0.014 | 0.021 |
| Variants | | | | | | |
| Variant 1 | $\xi 8$ | 0.8533 | 0.8600 | 0.8533 | 0.8412 | 0.8179 |
| $W_{10}:W_8 =$ | $\sigma_o 8$ | 0.049 | 0.051 | 0.038 | 0.063 | 0.069 |
| 10:9 | | | | | | |
| Variant 2 | $B_{10}/B_8$ | 1.134 | 1.070 | 1.017 | 0.977 | 0.941 |
| $W_{10}:W_8 =$ | $\xi 8$ | 0.8430 | 0.8477 | 0.8430 | 0.8291 | 0.8062 |
| 10:9-1/3 | $\sigma_o 8*$ | 0.062 | 0.049 | 0.055 | 0.063 | 0.066 |
| | $B_{10}/B_8$ | 1.162 | 1.095 | 1.042 | 0.998 | 0.962 |

*Fictitious values (for identical branch currents)

UNITED STATES PATENT AND TRADEMARK OFFICE
CERTIFICATE OF CORRECTION

PATENT NO. : 4,528,472
DATED : July 9, 1985
INVENTOR(S) : Herbert Auinger

It is certified that error appears in the above-identified patent and that said Letters Patent are hereby corrected as shown below:

Column 7 line 49, correct "$\phi$" to read --$\zeta$--.
Column 7 line 54, correct "$\phi$" to read --$\zeta$--.
Column 8 line 13, after the end of the line correct by adding --in FIG 10 and circles--.
Column 8 line 25, correct "$\sigma_o 10$" to read --$\sigma_{o10}$--; Table II correct to read:

TABLE II

8/10-pole N = 120) corresponding to FIG. 11

| Coil Pitch | | 1-12 | $\hat{=}\tau 10$ 1-13 | 1-14 | 1-15 |
|---|---|---|---|---|---|
| $2_{p1} = 8$ | $\xi 8$ | 0.8609 | 0.8962 | 0.9218 | 0.9372 |
| | $\sigma_o 8$ | 0.0111 | 0.0088 | 0.0111 | 0.0057 |
| $2_{p2} = 10$ | $\xi 10$ | 0.8952 | 0.9029 | 0.8952 | 0.8721 |
| | $\sigma_{o10}$ | 0.1069 | 0.0089 | 0.0169 | 0.0112 |
| $B_{10}/B_8$ | | 0.9617 | 0.9927 | 1.030 | 1.075 |

Column 8 line 55, correct "$2_{p1}12$ to read --$2_{p1} = 12$--.

UNITED STATES PATENT AND TRADEMARK OFFICE
CERTIFICATE OF CORRECTION

PATENT NO. : 4,528,472
DATED : July 9, 1985
INVENTOR(S) : Herbert Auinger

Page 3 of 4

It is certified that error appears in the above–identified patent and that said Letters Patent are hereby corrected as shown below:

Column 9, Table III, correct to read:

TABLE III

| | | $\hat{=}\tau 10$ | $\hat{=}\tau 12 + \frac{\tau N}{t}$ | $\hat{=}\tau 12 - \frac{\tau N}{2}$ |
|---|---|---|---|---|
| Coil Pitch | | 1-10 | 1-9 | 1-8 |
| $2_{p1} = 12$ | $\xi 12$ | 0.9476 | 0.9909 | 0.9909 |
| | $\sigma_o 12$ | 0.042 | 0.0176 | 0.0176 |
| $2_{p2} = 10$ | $\xi 10$ | 0.8312 | 0.8186 | 0.7811 |
| | $\sigma_o 10$ | 0.102 | 0.041 | 0.108 |
| $B_{12}/B_{10}$ | | 1.053 | 0.991 | 0.946 |

(12/10-pole, N = 90) corresponding to FIG. 17

UNITED STATES PATENT AND TRADEMARK OFFICE
CERTIFICATE OF CORRECTION

PATENT NO. : 4,528,472

DATED : July 9, 1985

INVENTOR(S) : Herbert Auinger

It is certified that error appears in the above-identified patent and that said Letters Patent is hereby corrected as shown below:

Column 10, line 25, correct "$\sigma$" to read -- $\zeta$ --.

Signed and Sealed this

Fourth Day of March 1986

[SEAL]

Attest:

DONALD J. QUIGG

Attesting Officer

Commissioner of Patents and Trademarks